(12) United States Patent
Harris

(10) Patent No.: US 11,602,961 B2
(45) Date of Patent: Mar. 14, 2023

(54) SELECTABLE AND HEIGHT ADJUSTABLE HITCH

(71) Applicant: Ronnie Harris, Tifton, GA (US)

(72) Inventor: Ronnie Harris, Tifton, GA (US)

( * ) Notice: Subject to any disclaimer, the term of this patent is extended or adjusted under 35 U.S.C. 154(b) by 28 days.

(21) Appl. No.: 17/030,367

(22) Filed: Sep. 23, 2020

(65) Prior Publication Data

US 2021/0086572 A1    Mar. 25, 2021

Related U.S. Application Data

(60) Provisional application No. 62/903,936, filed on Sep. 23, 2019.

(51) Int. Cl.
| | | |
|---|---|---|
| *B60D 1/06* | (2006.01) | |
| *B60D 1/46* | (2006.01) | |
| *B60D 1/44* | (2006.01) | |
| *B60D 1/155* | (2006.01) | |

(52) U.S. Cl.
CPC ............ *B60D 1/065* (2013.01); *B60D 1/155* (2013.01); *B60D 1/44* (2013.01); *B60D 1/46* (2013.01)

(58) Field of Classification Search
CPC .......... B60D 1/065; B60D 1/155; B60D 1/44; B60D 1/46; B60D 1/07; B60D 1/06
See application file for complete search history.

(56) References Cited

U.S. PATENT DOCUMENTS

| | | | | |
|---|---|---|---|---|
| 5,934,698 | A * | 8/1999 | Despain | B60D 1/46 280/490.1 |
| 7,255,362 | B2 * | 8/2007 | Smith | B60D 1/465 280/491.1 |
| 10,857,846 | B1 * | 12/2020 | Jacobs | B60D 1/06 |
| 2008/0122199 | A1 * | 5/2008 | Cearns | B60D 1/52 280/490.1 |
| 2013/0020784 | A1 * | 1/2013 | Weipert | B60D 1/54 280/490.1 |
| 2015/0102581 | A1 * | 4/2015 | Schwennsen | B60D 1/52 280/407 |
| 2015/0137484 | A1 * | 5/2015 | Columbia | B60D 1/58 280/507 |
| 2015/0184795 | A1 * | 7/2015 | Babuska | B60D 1/46 248/314 |

* cited by examiner

*Primary Examiner* — Jacob D Knutson
*Assistant Examiner* — Abigail R Hymel
(74) *Attorney, Agent, or Firm* — Brian D. Bellamy

(57) ABSTRACT

A selectable and height-adjustable hitch apparatus for towing comprising an elongated shank received by a vehicle attached to an upper bracket with pentagonal opposing vertical support arms with pinholes for angular adjustment of the elongate shaft to the upper bracket. An upper tube integral with the upper bracket in telescopic relation to at least one lower or middle tube and adjustable in length by aligned pinholes. A lower bracket integral with a lower tube receiving a ball mount, wherein the ball mount is angularly and height adjustable via the tow-hitch apparatus.

4 Claims, 7 Drawing Sheets

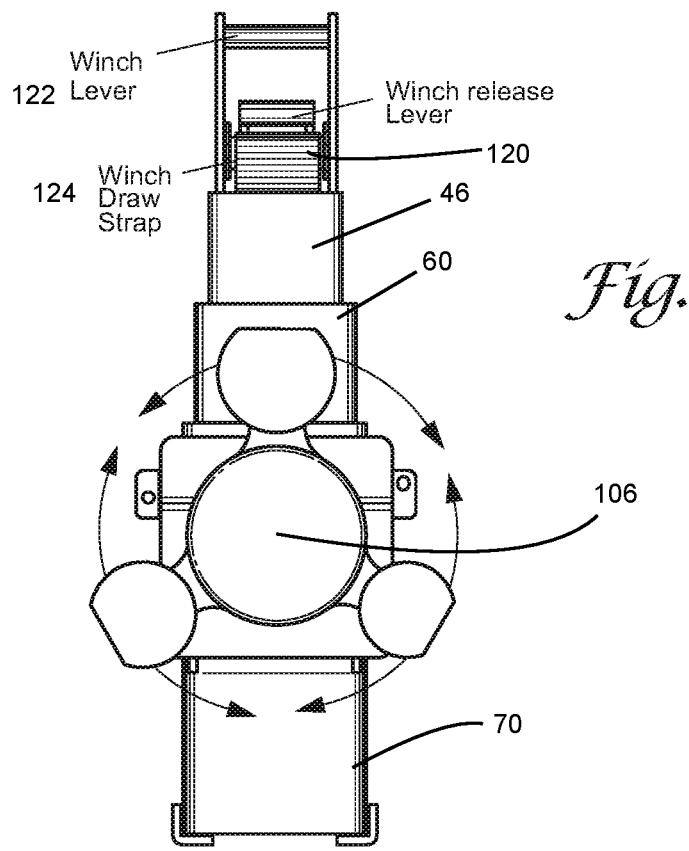
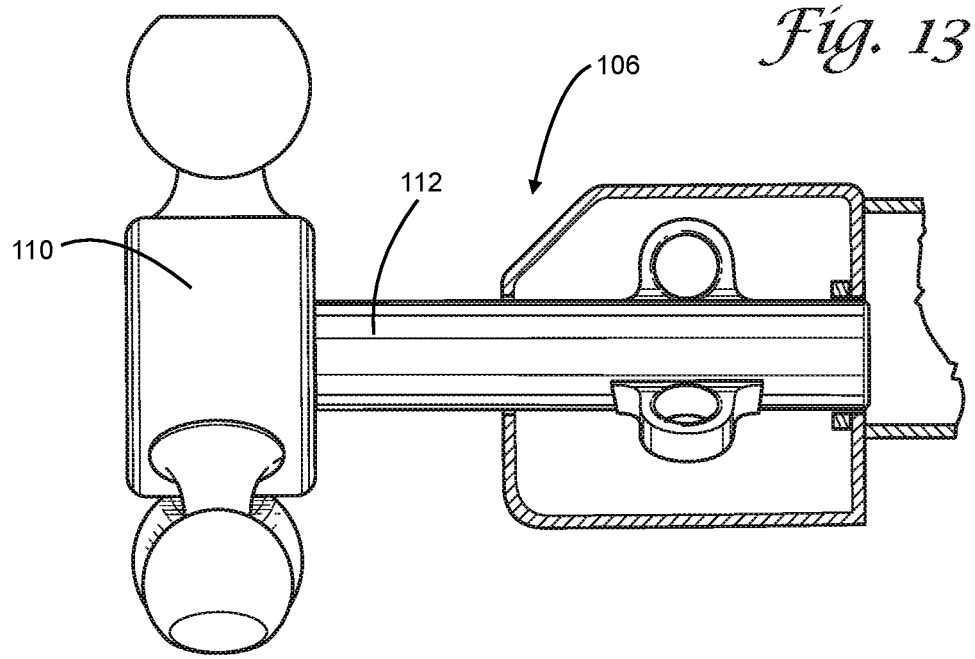

SELECTABLE AND HEIGHT ADJUSTABLE HITCH

PRIORITY CLAIM

The present application claims benefit of U.S. Provisional Application No. 62/903,936 filed on Sep. 23, 2019.

FIELD OF THE INVENTION

The present invention relates to a selectable height-adjustable hitch apparatus for towing. More particularly, the invention concerns a tow hitch apparatus having a plurality of telescopic tubular members and angularly adjustable brackets. The user can select and adjust the height and angle of the tow hitch apparatus relative to a towing vehicle.

BACKGROUND OF THE INVENTION

It is generally recognized that an efficient means for towing a trailer by a vehicle is by a ball hitch. In the typical installation, a two-bar and trailer hitch is mounted on a vehicle per specifications set forth by the manufacturer. The location of the trailer hitch is thus determined by the make and model of the vehicle. However, this location may not be ideal for some towing requirements. Moreover, the configuration of trailers also varies by manufacturer. Thus, a trailer may sometimes be inappropriately oriented to a vehicle regarding the height and angle of the trailer coupling member to the ball mounted on the vehicle's trailer hitch.

Therefore, a need exists for further improvements in tow hitch assemblies that will provide the vehicle's trailer hitch and the trailer's coupling device to be correctly oriented. Prior art tow hitch apparatus address certain aspects, such as the height of the trailer hitch, but fail to address all the aspects of height, angle, and distance of the ball mount from the vehicle.

SUMMARY OF THE INVENTION

Under a preferred embodiment of the present invention, there is provided a tow hitch comprised of an elongated shank for connection to the tow bar of a towing vehicle. The shank may comprise a typical rectangular shank as used with standard tow bar receptacles. The shank attaches to an upper bracket of the invention via modification and addition of a triangle-shaped flange member providing for angular adjustment of the shank to the tow hitch assembly.

A combination of telescoping tubes and arced pinholes in upper and lower brackets of the tow hitch assembly permit selectable height and angles. In accordance with a first aspect of the invention, an upper bracket includes arced pinholes for attachment of the shank to the upper bracket. A pinhole in the shank, through the selection of one of three or more pinholes, determines the angle of the shank to the upper bracket.

In a second aspect of the invention, the upper bracket includes an upper tube that is telescopically received by a middle tube. The middle tube, in turn, is telescopically received by a lower tube. Each of the three tubes adjusts relative to one another to adjust the overall length of the three tubes combined. These three tubes might be considered the vertical support for the ball mount. They may be situated vertically to the vehicle or at the combined tubes situated at an angle-dependent upon how the upper bracket is attached to the shank.

In a third aspect of the invention, the lower bracket includes vertical support arms for receiving a ball mount. Like the upper bracket, the lower bracket includes arced pinholes for support of the shaft of the ball mount as the ball mount is attached to the lower bracket. The pinhole chosen on the lower bracket will determine the angle of the ball mount to the lower bracket.

The angle of the ball mount may be chosen so that the combination of the angle of the elongate shank attached to the upper bracket and the vehicle tow bar and the shaft of the ball mount attached to the lower bracket cause the ball mount to be horizontal to the ground or aligned with the coupling on a trailer.

BRIEF DESCRIPTION OF THE DRAWINGS

The invention may take physical form in certain parts and arrangements of parts. A preferred embodiment is described in detail in this specification and illustrated in the accompanying drawings.

FIG. 12 is a front elevational view of the tow-hitch apparatus illustrating a variation with selectable ball support and winch.

FIG. 13 is a sectional, side, elevational view of a ball mount support illustrating a variation of the invention with selectable ball support.

DETAILED DESCRIPTION OF THE PREFERRED EMBODIMENT

Figure 1:
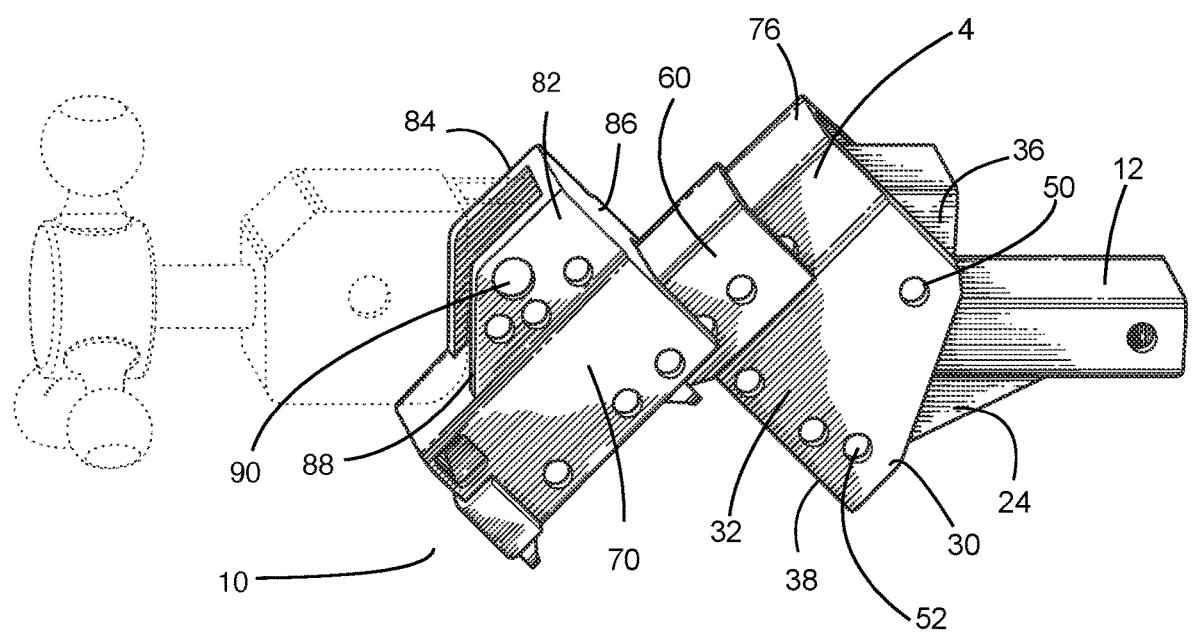
FIG. 1 is a perspective view of a selectable tow-hitch apparatus, illustrating a preferred embodiment of the present invention.
Figure 2:
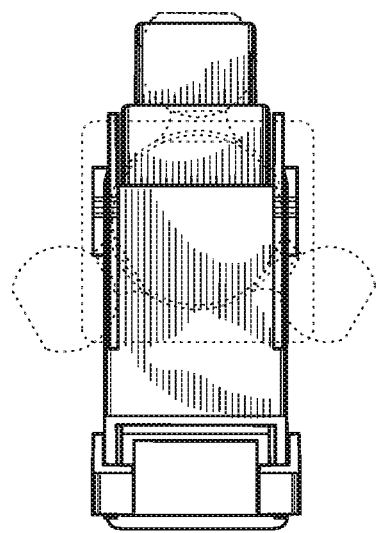
FIG. 2 is a front elevational view of the tow-hitch apparatus, as shown in FIG. 1.
Figure 3:
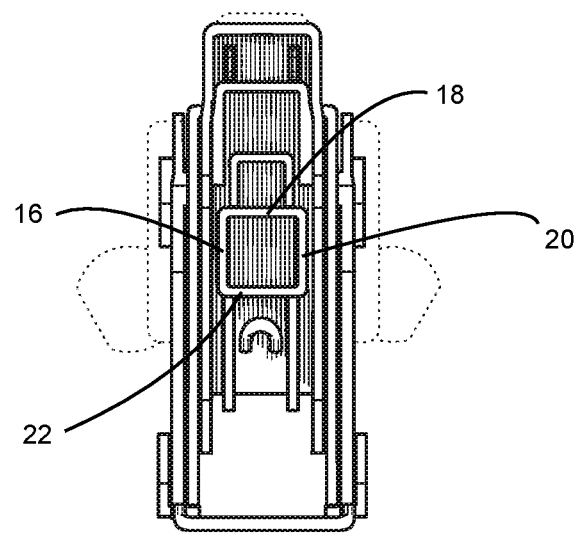
FIG. 3 is a rear elevational view of the tow-hitch apparatus, as shown in FIG. 1.
Figure 4:
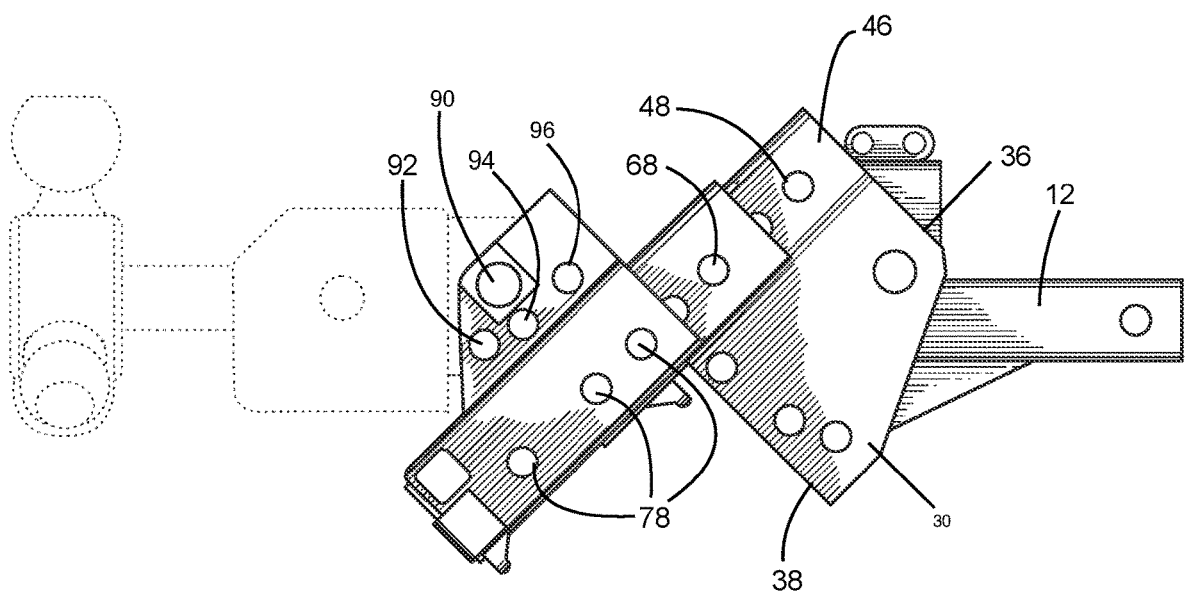
FIG. 4 is a right side elevational view of the tow-hitch apparatus, as shown in FIG. 1.
Figure 5:
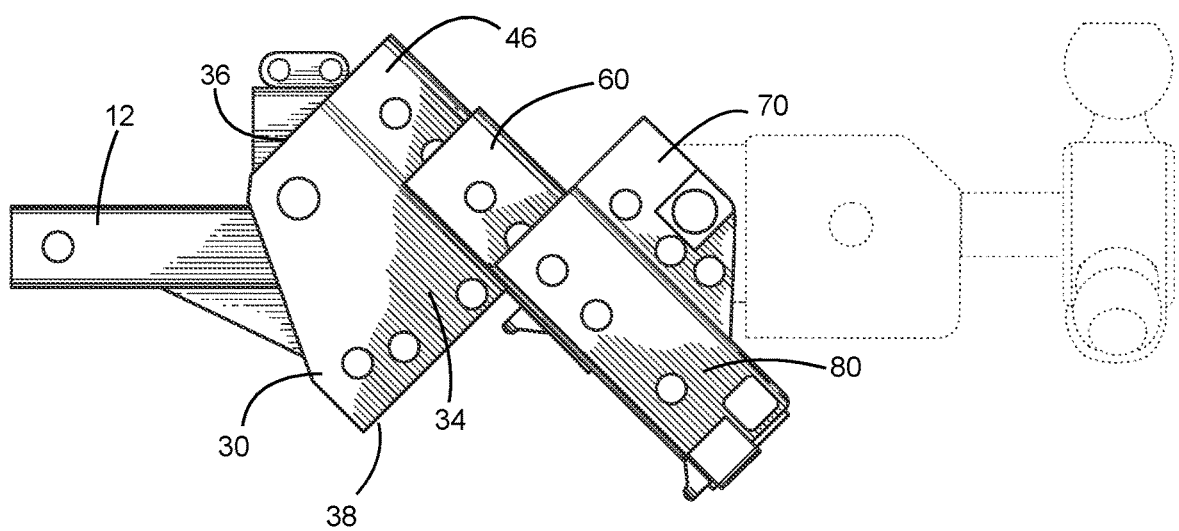
FIG. 5 is a left side elevational view of the tow-hitch apparatus, as shown in FIG. 1.
Figure 6:
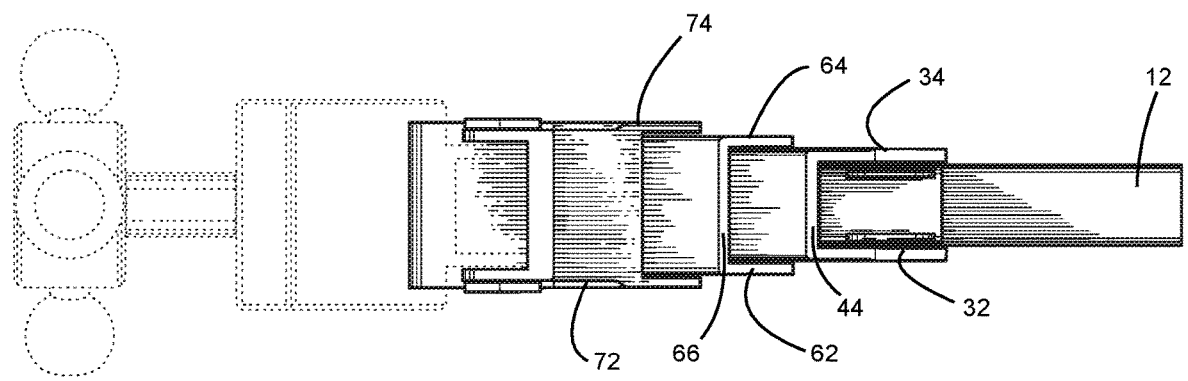
FIG. 6 is a top elevational view of the tow-hitch apparatus, as shown in FIG. 1.
Figure 7:
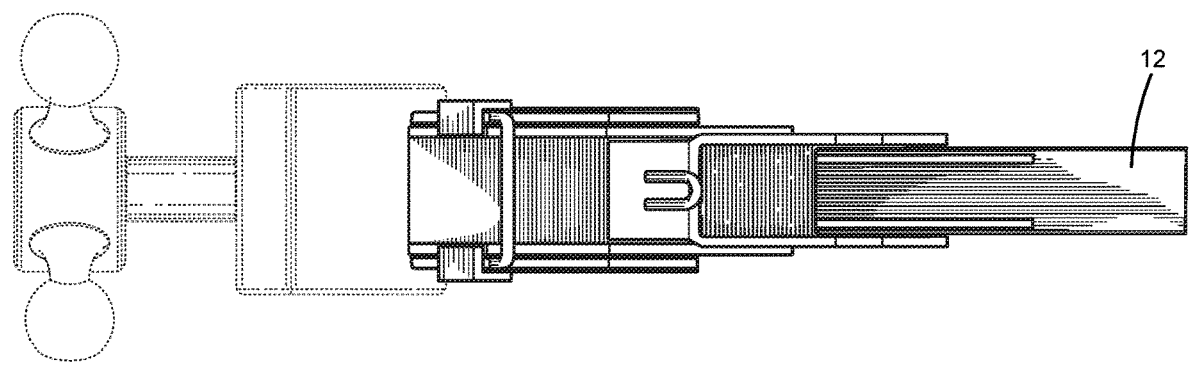
FIG. 7 is a bottom elevational view of the tow-hitch apparatus, as shown in FIG. 1.
Figure 8:
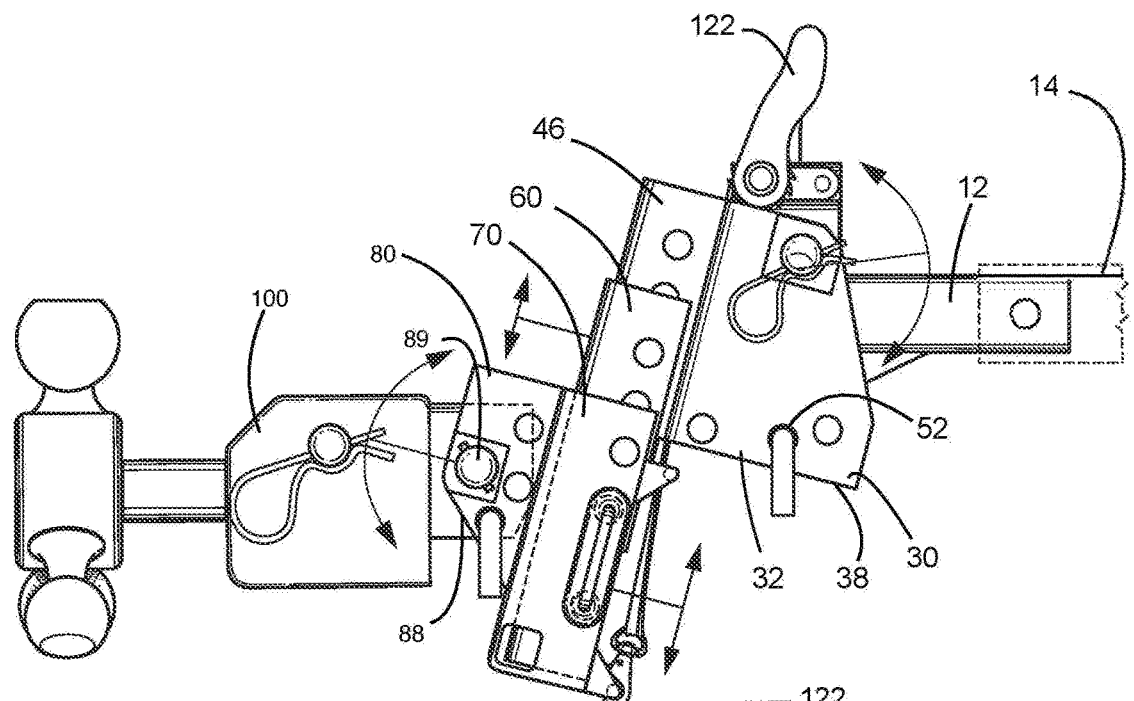
FIG. 8 is a side elevational view of a selectable tow-hitch apparatus, illustrating a variation of the preferred embodiment and showing the apparatus accepting a ball mount and ball coupled to the apparatus.
Figure 9:
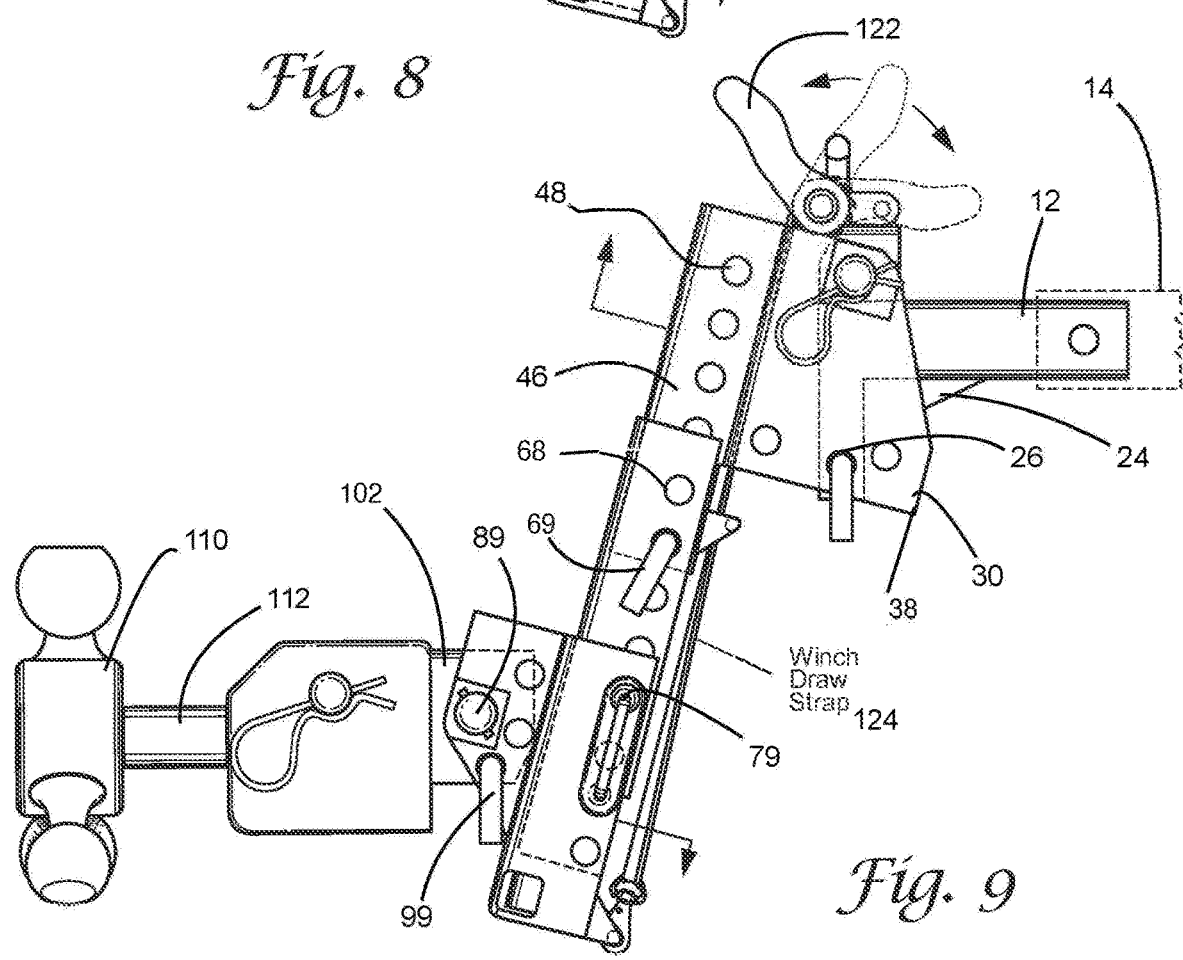
FIG. 9 is a side elevational view of a tow-hitch apparatus, as shown in FIG. 8, illustrating the apparatus in a more elongate selected arrangement than in FIG. 8.

Referring now to the drawings, FIGS. 1-7 show a selectable tow-hitch apparatus 10, illustrating a preferred embodiment of the invention. The tow-hitch apparatus includes an elongated shank 12 supported by the tow-hitch apparatus and connectable to a towing vehicle, such as by a towing vehicle's tow bar with trailer hitch receptacle. The dashed lines in FIGS. 8-9 illustrate one such receptacle 14, in which the dashed lines indicate that the vehicle receptacle does not form a part of the invention or limitation thereon. The elongated shank, or shank herein, includes four side surfaces 16, 18, 20, 22, and the elongated shank forms an elongate rectangular shaped tube. The shank includes a pinhole on the interior end of the shank. In other words, the end was inserted into a vehicle receptacle for connection of the shank to the receptacle on the towing vehicle. On the opposing end, distal from the end received by the vehicle, the shank includes a triangular flange member 24 attached to the bottom of the shank's rectangular formed tube. The triangular flange supports the shank and includes a pinhole 26 in the flange member to attach the shank to an upper bracket 30.

The upper bracket 30 includes opposing horizontally spaced pentagonal vertical support arms 32, 34. These vertical support arms form members and surfaces of the upper bracket 30. The upper bracket comprises three surfaces, including an end and two sides formed by the previously mentioned vertical support arms 32, 34. The opposing surfaces of the pentagonal vertical support arms include a top edge 36 and a bottom edge 38 in which the bottom edge is longer than the top edge. The opposing vertical support arms 32, 34 thereby include and provide for an open end and a closed-end thereof, in which the closed-end is adjoined to the opposing vertical support arms by a structural member 44, forming the closed-end surface of the upper bracket. The structural member 44 joins the vertical support arms 32, 34, whereby the adjoined closed ends of the upper bracket form a three-sided rectangular shaped tube forming an upper tube 46 of a telescopic structure. Note that the upper tube 46 includes upper tube pinholes 48 for adjustment of the telescopic structure, which is discussed further herein. Meanwhile, the upper bracket, particularly the vertical support arms, provides a mount for coupling and attaching the shank 12 between the vertical support arms 32, 34 via an upper pinhole 50 above the top surface of the elongate shaft and upper bracket lower pinholes 52 that aligns with the pinhole 26 on the triangular flange member 24 of the shank 12.

The upper bracket lower pinholes 52 may consist of one or more eccentric lower pinholes situated along an arc on the lower portion of the upper bracket's vertical support arms. The lower pinholes provide for a selection of three or more positions. The selected lower pinhole will determine the position of the shank 12 relative to the upper bracket. The position of the shank will adjust the tilt or angle of the upper bracket to the shank and thus the vehicle. At least three or more positions for the shank may be provided by providing three or more lower pinholes in the upper bracket. The selected pinhole will also modify and help determine the selection of the distance of the tow-hitch assembly or ball mount with respect to the vehicle, which may be necessary for some trailer applications.

Referring now back to the drawings, the tow-hitch apparatus 10 includes a middle tube 60. The middle tube 60 includes three vertical support members 62, 64, and 66. Two of the vertical support members 62 and 64 are opposing vertical support members, and the third vertical support member 66 joins the two opposing vertical support members. The middle tube comprises an open-sided rectangular tube formed by the three vertical support members. The middle tube forms the middle of the telescopic structure of the tow-hitch apparatus. The middle tube includes pinholes 68 vertically aligned along the length of the middle tube, and these pinholes on the middle tube may align with the pinholes 48 on the upper tube 46 that is situated along the upper tube's length. The middle tube aligns with the outer frame of the upper tube of the telescopic structure, and the upper tube of the upper bracket slides one within another in the middle tube, and are thus capable of being extended or shortened in combination with one another. Pin 69, as shown in FIGS. 8-9, insert through the aligned pinholes 68 of the middle tube and pinholes 48 of the upper tube of the upper bracket to connect the middle tube 60 and upper tube 46. Sliding the middle tube and the upper tube along one another to align pinholes and selected the preferred aligned pinholes helps to determine the length of the telescopic structure.

Referring again to FIGS. 1-6, a lower tube 70 is provided in the telescopic structure that includes three vertical support members 72, 74, 76, forming an open-sided rectangular tube from by the three vertical support members similar in structure to the middle tube 60. Two of the vertical support members of the lower tube 70 are opposing vertical support members 72, 74, and the third vertical support member 76 joins the two opposing vertical support members of the lower tube 70. The lower tube forms the lower portion of the telescopic structure that includes three tubes, to wit: upper, middle, and lower. The lower tube, like the middle and upper tubes, includes pinholes 78 that align with the pinholes 68 of the middle tube 70 of the telescopic structure of the tow-hitch apparatus 10. The middle tube slides one within another in the lower tube, and are thus capable of being extended or shortened. Pin 79, as shown in FIGS. 8-9, insert through the aligned pinholes 68, 78 of the middle tube 60, and lower tube 70 to connect the two together and determine the combined length. Whereby sliding the lower tube and middle tube to align the pinholes selected helps to determine the length of the telescopic structure and helps to determine and adjust the height of the ball mount 100.

A lower bracket 80 is integrally formed with or connected to the lower tube 70. In the preferred embodiment shown, the lower bracket is adjoined to the third vertical support member 76 of the lower tube. The lower bracket 80 has opposing horizontally spaced pentagonal vertical support arms 82, 84 that form side surfaces of the lower bracket. Altogether, the lower bracket in the embodiment shown includes three sides, a top member 86 with the top surface and side vertical support arms 82, 84 with side surfaces. The top member 86 of the lower bracket 80 adjoins the opposing sides comprised of the pentagonal vertical support arms 82, 84 of the lower bracket along the top edges of these opposing sides. The top member 86 may provide a stop for adjusting the vertical angle of the hitch ball and ball mount member in some configurations of the attached ball mount. The opposing surfaces of the pentagonal vertical support arms 82, 84 on the lower bracket include a top edge and a bottom edge in which the bottom edge 88 is angular, not 90 or 180 degrees, and the bottom edge is longer than the top edge of the lower bracket portion of the combined lower bracket and lower tube.

The opposing vertical support arms 82, 84 of the lower bracket 80 provide a structure having an open end and a closed-end, closed by the lower tube's structure. The closed-end is adjoined to the adjoining vertical support member 76 of the lower tube 70 on the surface of the adjoining vertical support member facing the lower bracket. Thus, the adjoining vertical support member of the lower tube provides a structural member adjoining the vertical support arms of the lower bracket. The composite structure of the opposing sides of the lower bracket and vertical support member of the lower tube provides a bracket for mounting/attaching the ball mount via a pin 89, shown in FIGS. 8-9 inserted through the vertical support arms 82, 84 of the lower bracket 80, and pinhole 90.

The lower bracket 80 has pinholes 92, 94, 96 (1$^{st}$, 2$^{nd}$, and 3$^{rd}$ pinholes) in the lower bracket. The eccentric pinholes provided on an arc in the vertical support arms 82, 84 provide for adjustment of the angle for attaching the ball mount to the lower bracket, while the ball mount pivots about the axial support pin 89. The eccentric pinholes 92, 94, 96 through the vertical support arms for receiving angular adjustment pin 99 for the ball mount. By providing three of these eccentric pinholes, the lower bracket allows for three or more positions/angles for the ball mount to be configured relative to the lower bracket. The combinations of the telescoping tubes and angular adjustment of both the upper bracket and lower bracket provide compound adjustment of the ball mount to an ideal location relative to the vehicle and the trailer.

Figure 10:
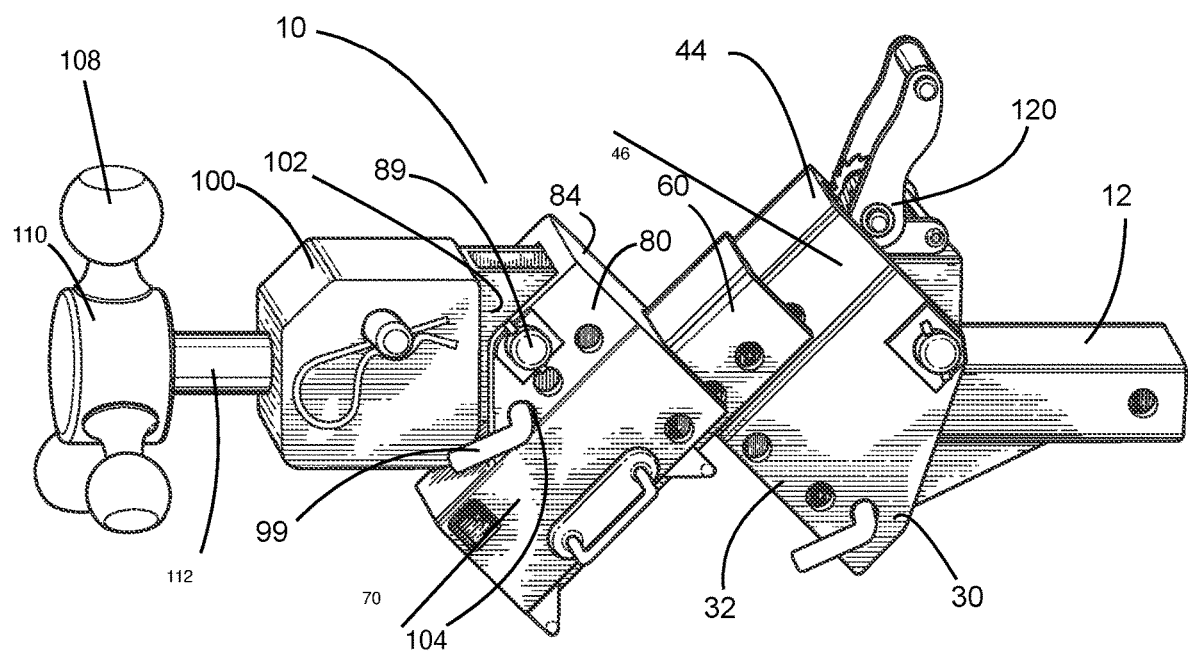
FIG. 10 is a perspective view of a selectable tow-hitch apparatus, illustrating a variation of the preferred embodiment and showing the apparatus accepting a ball mount and ball coupled to the apparatus.
Figure 11:
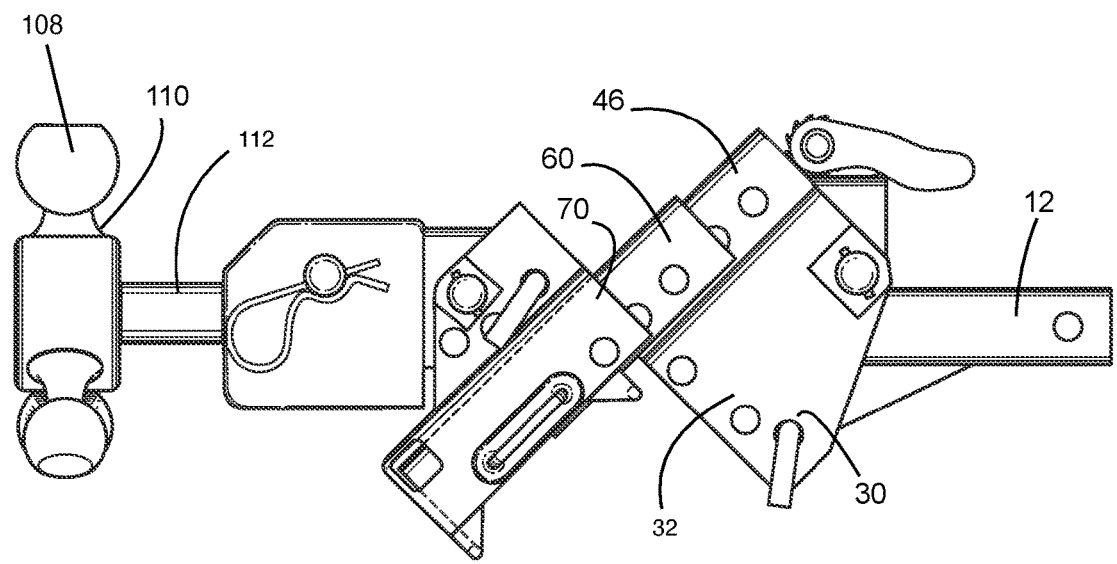
FIG. 11 is a sectional, side, elevational view of the tow-hitch apparatus illustrating a variation of the lower bracket and illustrating the lower bracket of the apparatus accepting a ball mount and ball.

As shown in FIG. 10, the lower tube 70 and the middle tube 60 may be consolidated into a singular structure with the lower bracket 80 attached to the lower portion of the structure. In this configuration, the consolidated structure provides a lower tube without a middle tube. The lower tube slides relative to the upper tube to maintain the telescopic structure of the tow-hitch apparatus. The configuration provides a less mechanically complex structure but may limit length for adjustment of height and prevents the removal of the middle tube when not needed. Further, the eccentric pinholes on arc in the vertical support arms of the lower bracket may be removed, as shown in FIG. 10. In this configuration of the embodiment, the ball mount is connected to the lower bracket at a fixed angle. However, the overall angle of the tow-hitch apparatus may be adjusted by adjusting the angle of the upper bracket with respect to the vehicle.

A preexisting standard ball mount may be used in some configurations or angles and heights with the preferred embodiment described. The ball mount may also be modified and configured especially for use under the preferred embodiment. In the figures, the ball mount 100 shown includes a rectangular tube or block 102 with an eccentric pinhole 104 that receives the axial support pin 99. The axial support pin 89 is inserted into lower bracket 80, and the ball mount block 102 rests on the angular adjustment pin 99 of the lower bracket. The ball mount includes a support 106 or receptacle for attachment of a ball 108.

The support 106 may comprise a receptacle 110, as shown in FIGS. 8-13 that carries a plurality of hitch balls. Each ball may be received by the receptacle 110 for rotatable selection via rotation of a tubular shank 112 of the support 106. The shank may be holding a plurality of balls of different size mounted thereon.

Referring further to FIGS. 1-6 and FIGS. 8-9, the upper tube of the upper bracket includes pinholes forming an adjustment mechanism for the length of the tow-hitch apparatus.

Structurally, the upper tube can combine with additional tubes of the apparatus to elongate or contract per the user's selection of length by inserting pins through overlapping pinholes of telescopically overlapping tubes discussed hereinbelow. By adjusting the length of the tow-hitch apparatus, the height of the ball mount coupled to a trailer can be selected for the best fit. Once the telescoping tubes and a ball with ball mount are connected, the weight of the tow-hitch apparatus combined with the ball and ball mount may be prohibitively heavy. In this regard, a winch 120 with winch mechanisms includes a handle 122, and draw strap 124 is provided for lifting and adjusting the tow-hitch apparatus. The draw strap 124 connects to the winch 120 and the lower tube 70 to lift the lower tube. FIGS. 1, 4, 5, 7, and 8-9 show U-brackets 120, 122 attached to the lower tube 70 that receive a winch strap. The strap attaches to the lower U-bracket 120 and runs up through the upper U-bracket 122 toward a winch 120, where the winch handle is used to tighten or loosen the draw strap to lift or lower the lower tube. The upper bracket 30 has a support structure shown in FIGS. 4-5 and FIGS. 8-9 for connecting the winch to the upper bracket.

The preceding description is a specific embodiment of the present invention and discussion of variations of the specific embodiment. It should be appreciated that this embodiment is described for illustration only. Numerous alterations and modifications may be practiced by those skilled in the art without departing from the spirit and scope of the invention. It is intended that all such modifications and alterations be included insofar as they come within the scope of the invention as claimed or the equivalents thereof.

I claim:

1. A selectable and height-adjustable hitch apparatus for towing comprising:
   a. an elongated shank received by a vehicle,
   b. the elongated shank attached to an upper bracket with at least one pin and at least one upper bracket lower pin receiving hole providing angular adjustment of the elongated shank to the upper bracket,
   c. an upper tube integral with the upper bracket having upper tube pinholes,
   d. including both a middle tube with middle tube pinholes and a lower tube with lower tube pinholes,
   e. the upper tube received in telescopic relation to the middle tube with the middle tube pinholes, and adjustable in length by at least one pin and alignment of at least one of the upper tube pinholes with the middle tube pinholes,
   f. and said middle tube received in telescopic relation to the lower tube and adjustable in length by at least one pin and alignment of at least one of the middle tube pinholes with the lower tube pinholes, and
   g. a lower bracket integral with the lower tube receiving a ball mount.

2. The selectable and height-adjustable hitch apparatus of claim 1, said upper bracket includes pentagonal opposing vertical support arms.

3. The selectable and height-adjustable hitch apparatus of claim 2, said pentagonal opposing vertical support arms include at least three upper bracket lower pin receiving holes for angular adjustment of the upper bracket to the elongated shank.

4. The selectable and height-adjustable hitch apparatus of claim 1, said ball mount angularly and height adjustable via the tow-hitch apparatus.

* * * * *